United States Patent
Reist (10) Patent No.: US 9,388,788 B2
(45) Date of Patent: Jul. 12, 2016

(54) CONVEYING DEVICE FOR PRODUCING ENERGY

(75) Inventor: Walter Reist, Hinwil (CH)

(73) Assignee: WRH WALTER REIST HOLDING AG, Ermatingen (CH)

( * ) Notice: Subject to any disclaimer, the term of this patent is extended or adjusted under 35 U.S.C. 154(b) by 269 days.

(21) Appl. No.: 13/498,729

(22) PCT Filed: Sep. 30, 2010

(86) PCT No.: PCT/CH2010/000236
§ 371 (c)(1),
(2), (4) Date: Jun. 11, 2012

(87) PCT Pub. No.: WO2011/041918
PCT Pub. Date: Apr. 14, 2011

(65) Prior Publication Data
US 2012/0248787 A1    Oct. 4, 2012

(30) Foreign Application Priority Data

Oct. 5, 2009  (CH) ........................ 1534/09
Mar. 9, 2010  (CH) ........................ 317/10

(51) Int. Cl.
F03G 3/04 (2006.01)
H02K 7/18 (2006.01)
F03B 7/00 (2006.01)

(52) U.S. Cl.
CPC ............... *F03B 7/006* (2013.01); *Y02E 10/223* (2013.01); *Y02E 10/28* (2013.01)

(58) Field of Classification Search
CPC ............ F03B 7/006; F03B 7/003; F03B 9/00; F03B 17/066; F03B 17/064
USPC ............................................. 290/1 R, 43, 54
See application file for complete search history.

(56) References Cited

U.S. PATENT DOCUMENTS 119,580 A   10/1871  Daniels
192,286 A    6/1877  Rose
(Continued)

FOREIGN PATENT DOCUMENTS

BE    373267     10/1930
CH    119299      5/1927
(Continued)

*Primary Examiner* — Tulsidas C Patel
*Assistant Examiner* — Viet Nguyen
(74) *Attorney, Agent, or Firm* — Rankin, Hill & Clark LLP (57) ABSTRACT

A conveying device for producing energy, including a circulating conveying member of containers, which have a load strand and a return strand, the conveying device being equipped in such a way that the conveying device slides or rolls downward by means of the load strand on a inclined plane having an angle (alpha), wherein the load strand moves the return strand, and a device for drawing power arranged on the conveying member and being moved by the circulating conveying member, the device including a means for removing energy from the device. The method for operating the device is characterized in that, while the conveying member is circulating, the first container running into the load strand (in the area of arrow A) is loaded with a burdening good and the good is discharged shortly before exiting the load strand (at arrow B).

16 Claims, 8 Drawing Sheets

(56) References Cited

U.S. PATENT DOCUMENTS

| | | | |
|---|---|---|---|
| 424,868 A | 4/1890 | Ethridge | |
| 827,845 A | 8/1906 | Bloss | |
| 920,361 A | 5/1909 | Merriam | |
| 1,216,080 A | 2/1917 | Cooke | |
| 1,457,927 A | 6/1923 | Frederick | |
| 1,510,740 A | 10/1924 | Damon | |
| 1,567,971 A | 12/1925 | Martin et al. | |
| 2,758,814 A | 8/1956 | Kratz | |
| 4,698,516 A * | 10/1987 | Thompson | 290/54 |
| 5,684,335 A * | 11/1997 | Ou | 290/54 |
| 8,042,334 B2 * | 10/2011 | Ribeiro | 60/495 |
| 2003/0132635 A1 * | 7/2003 | Ganimian | 290/1 R |
| 2005/0286975 A1 | 12/2005 | Fonfrede et al. | |
| 2006/0290139 A1 * | 12/2006 | Takeuchi | 290/54 |
| 2010/0096861 A1 * | 4/2010 | Bak | 290/1 R |
| 2010/0181773 A1 * | 7/2010 | Reist | 290/54 |

FOREIGN PATENT DOCUMENTS

| | | |
|---|---|---|
| CH | 696770 | 11/2007 |
| DE | 1018000 | 10/1957 |
| DE | 2418660 | 10/1975 |
| DE | 4138601 | 5/1993 |
| DE | 4223952 | 2/1994 |
| DE | 19818549 | 11/1999 |
| DE | 202005008463 | 10/2006 |
| EP | 1795747 | 6/2007 |
| EP | 1980745 | 10/2008 |
| EP | 2461017 | 6/2012 |
| FR | 891684 | 3/1944 |
| FR | 2304205 | 10/1976 |
| FR | 2613780 | 10/1988 |
| JP | 0000004848 | 10/1901 |
| JP | 2003042049 | 2/2003 |
| WO | 2009093256 | 7/2009 |
| WO | 2011/041918 | 4/2011 |
| WO | 2011/060265 | 5/2011 |

\* cited by examiner

CONVEYING DEVICE FOR PRODUCING ENERGY

BACKGROUND OF THE INVENTION

The invention relates to a conveying device with which liquid or solid media having bulk material capability are received, transported and discharged.

BRIEF SUMMARY OF THE INVENTION

Instead of a drive, the conveying device has a generator for producing electrical energy. The device is driven only by gravity.

The novel aspect of this invention is that a "linear" conveying mechanism of containers which move from top to bottom on an oblique plane, are weighed down continuously with a medium and after a certain running time or distance are emptied and guided back. The weighed-down part of the conveying mechanism is a kind of load strand and the no longer weighed-down part of the conveying mechanism guided back is a kind of return strand. Since the weighed-down part continuously moves the return strand along in a kind of downhill run, all that has to be ensured is that continuous loading and continuous emptying take place. Depending on the power requirement, either the angle of the oblique plane, the length of the load strand or the degree of filling of the containers can be varied. The return strand can be guided back to the load strand upside-down or in a plane. A device for extracting power, for example a wheel-like device, engages in the conveying mechanism and corotates therewith. On the axle of this device there is arranged, for example, a generator, in which electricity is produced by the rotation of the axle. Of course, the torque can also be used further directly for work.

DETAILED DESCRIPTION OF THE INVENTION

Figure 1:
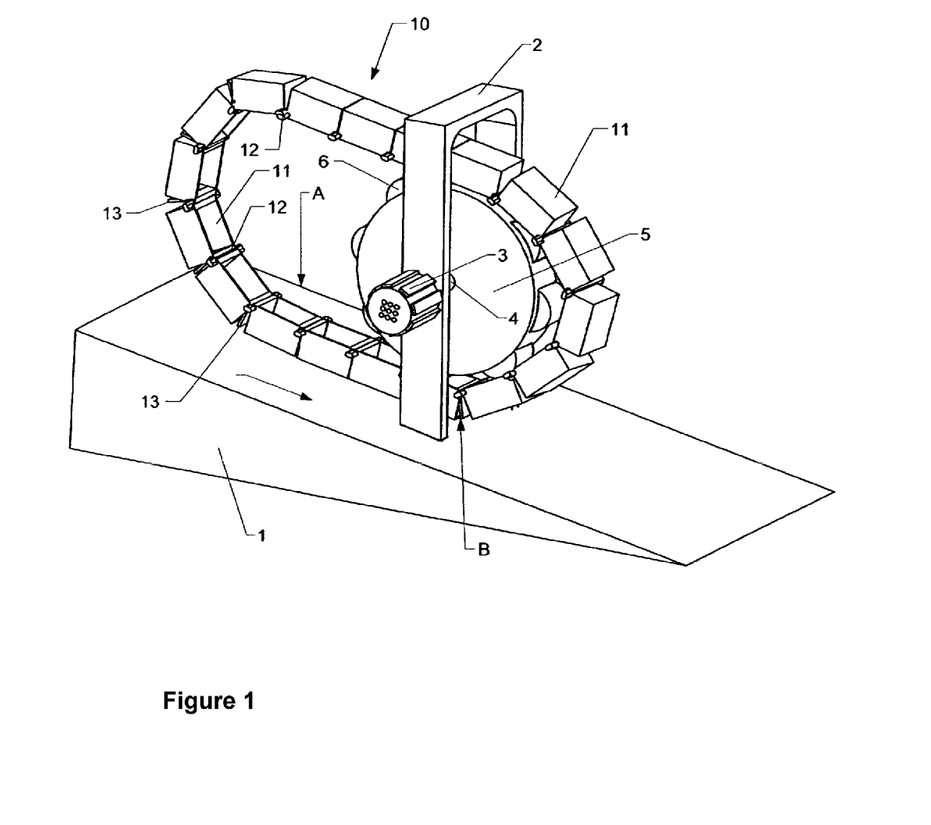
FIG. 1 shows an overview illustration of the assembled functional means in the form of a model.
Figure 3:
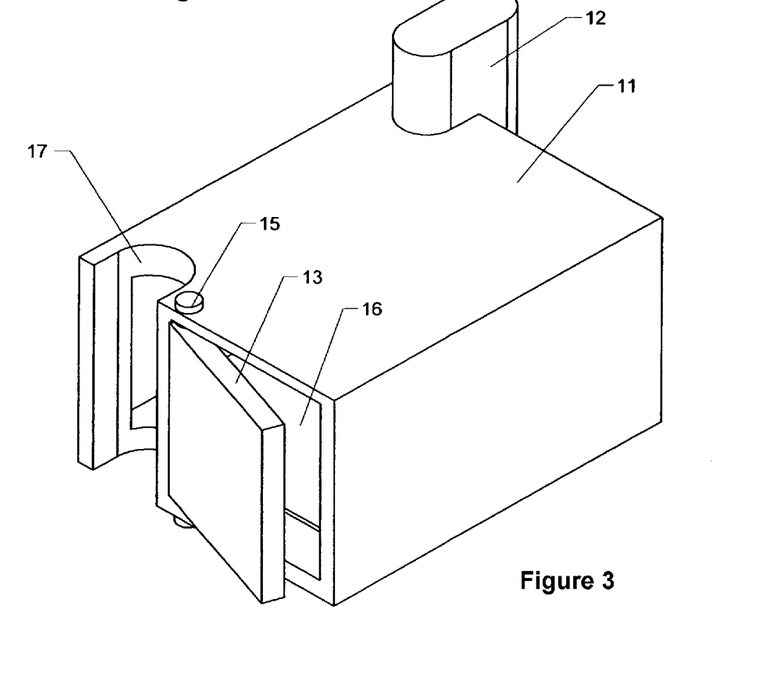
FIG. 3 and FIG. 4 show an example of a conveying mechanism container having means for filling and emptying.
Figure 4:
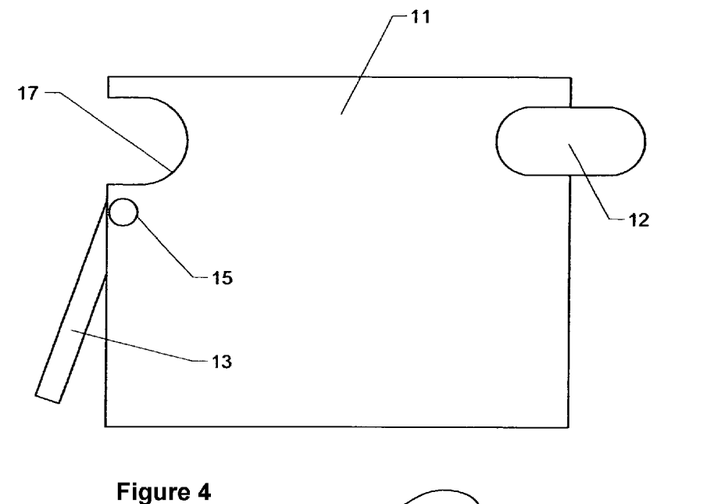

FIG. 1 schematically shows the means with which the invention can be realized. These means can have multifarious configurations. An example is shown in FIGS. 3 and 4.

FIG. 1 shows an oblique, wedge-shaped foundation 1, which may be, for example, an inclined base, to which the device is firmly joined on the horizontal via a support means 2, for example a U-shaped profile 2. This is for purely illustrative reasons in order to show and discuss the effect of the oblique plane under the conveying mechanism 10. The circulating conveying mechanism is formed from containers 11 that are joined together via connecting means 12. The load strand of the conveying mechanism 10 runs on the oblique plane, which may be, for example, a downhill slope. The containers 11, which are arranged next to one another in a row, slide or roll on this oblique plane and form the load strand as long as they are moving on this plane. The sliding can take place, for example, on a liquid film of the liquid medium. The containers are loaded in the region of the arrow A and they are emptied again in the region of the arrow B. The emptied containers are guided over a device 5 for extracting power, which runs over an axle 4 in the U-shaped profile, and are guided back to the filling station at the arrow A as a return strand. The device 5 for extracting power, for example a wheel 5 having driving cams 6, engages in the clearly visible cavities in the containers and is so to speak entrained by the thrust from the load strand and rotated, electricity being produced from this rotation via a generator 3, which is illustrated in a stylized manner. The device for extracting power can of course also be driven via the connecting means 12.

In the return strand it can be seen that the containers 11 support one another and thus partially form a rigid conveying mechanism 10. The containers 11 have a flap 13, for example on the front wall running in the direction of movement, for emptying the loading material. These emptying flaps 13 are pressed closed in the load strand by the rear sides of the preceding containers 11 and are thus sufficiently sealed, even in the case of liquid media. This arrangement of the emptying flaps avoids the situation whereby the filling material has to be lifted counter to gravity, and this energy would have to be subtracted from the efficiency of the device.

If a loaded container weighs, for example, 100 kg and an empty container, for example, 20 kg, this results in a ratio of 5:1, which can be exploited on the oblique plane for load force. The containers, which are guided from the load strand into the return strand counter to gravity, are balanced by the containers from the return strand to the load strand with gravity, and so, besides frictional forces inherent to the device, only the uphill energy for the return strand is lost.

Figure 2:
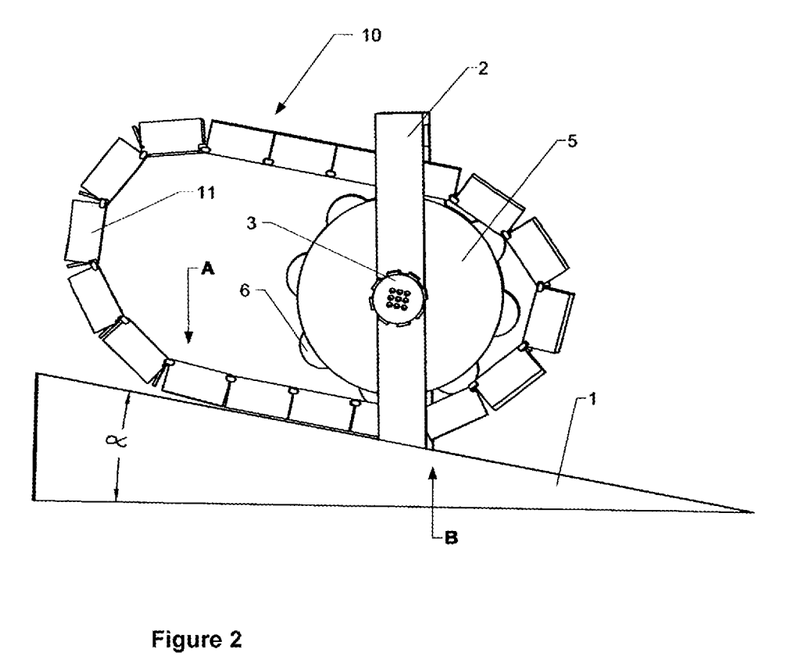
FIG. 2 shows the illustration from the side, with an example of an angle of the oblique plane being indicated.

FIG. 2 shows the discussed device from the side and indicates an example of a selected inclination angle of alpha. Depending on the configuration of the device in terms of length and depending on whether sliding or rolling containers are used, the oblique plane can be more or less steep. Depending on the power requirement, the angle can be selected to be different, and likewise the length of the load strand. The figure also shows how the driving means 6 on the device 5 for extracting power engage in the cavities in the containers 11. It is thus clear that the device does not have to be a precision construction, but represents a very robust matter which must and can operate under the most adverse conditions.

Now a small calculation per container:

$F_G$: weight force of the mass=1000 kp
$F_{GH}$: downhill slope force component of the weight force $F_G$
$\alpha$: inclination angle of the oblique plane=10°
$F_{GH}=F_G \times \sin \alpha = 1000 \times 0.174 = 174$ kp per loaded container in the load strand downwards and minus ⅕ thereof, namely 35 kp in the return strand upwards. This results in around 140 kp downhill slope force per loaded container in the conveying mechanism of the device.

In the four containers shown, it is 560 kp, and in the case of a conveying mechanism of 100 containers, the load force, which is not to be ignored, down the slope of 14 000 kp or 14 metric tons. If steeper paths are selected, more downhill slope force is obtained linearly, for example at 20°, which is quite steep, 28 metric tons for the same device. Once this device is "on the move", it has great inertia with respect to changes in speed, thereby producing a stable run.

Rolling friction, sliding friction and other losses are ignored in all of these rough calculations. All that is intended to be shown here is the power that can be expected.

A particular rotational speed per unit time is assumed for the production of electricity in generators. It can be seen straightaway that if a generator 3 is placed on the axle 4 of the relatively large device 5 for extracting power, such rotational speeds can scarcely be achieved. Thus, a step-down ratio of, for example, 10:1, which is not shown here, is necessary in order for example to obtain a desired rotational speed for the generator.

FIGS. 3 and 4 show different views of an example of a container 11, one wall of which, specifically the front wall running in the direction of movement, is provided with a flap 13. This flap can be mounted in a manner pivoting loosely via an axle 15 or it can be provided with means, not illustrated here, which support opening for quicker emptying. Both figures show the connecting means 12, which is illustrated in a stylized manner, the recesses 17 for the engagement of the connecting means 12 and FIG. 3 clearly shows the cavity 16 in the container 11. It is assumed that as soon as the front container in the direction of movement releases the closing pressure on the flap 13 of the container running behind it by pivoting into the return strand, the pressure of the filling material opens the flap and said filling material pours out.

Once the containers have been emptied, the material must be transported further. This can take place in various ways. If only electricity is to be produced with the device, water is used as the filling medium and is simply allowed to run out at the bottom, at the end of the load strand, for example back into the flow of water. However, if material which is intended to be transported further is being transported, then, for example, conveyor belts for continuous operation or, for example, trucks for batchwise operation, should be provided. If this oblique plane consists, for example, of a ramp having two rails, there is room between these rails to provide, for example in the case of bulk material, a further conveying means, such as by truck. A special opening for loading further conveying means can also be provided. In these cases, the plant runs in batchwise operation, i.e. not continuously.

The operation of the device is selected such that, as the conveying mechanism 10 circulates, the first container 11 running into the load strand is loaded with a material for weighing down and this material is emptied out shortly before the filled container 11 leaves the load strand. The material for weighing down is filled continuously or in batches into the first container 11 running into the load strand. The material for weighing down may be liquid or solid, but having bulk material capability. Depending on the power requirement, the inclination (angle alpha) of the oblique plane is set, or the length of the load strand is calculated and selected and accordingly used, or the degree of filling of the containers is calculated and selected and accordingly filled, or any desired combination of all three setting possibilities is provided and implemented in operation.

Figure 5:
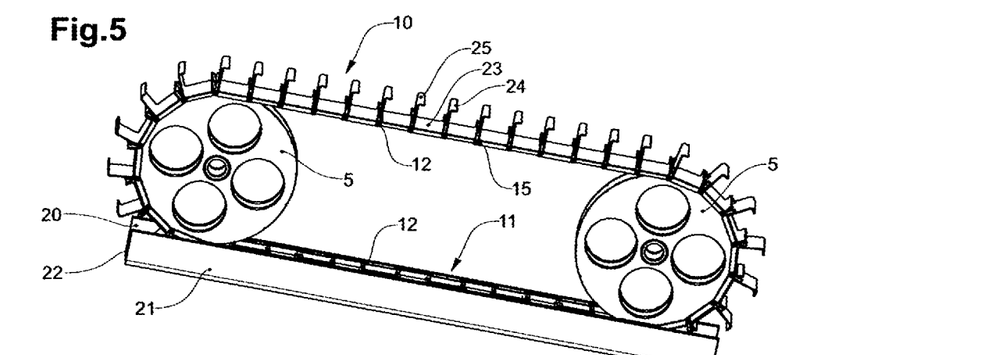
FIG. 5 shows a specific configuration of the containers as "vessels" or chambers for transporting the driving mass.
Figure 6:
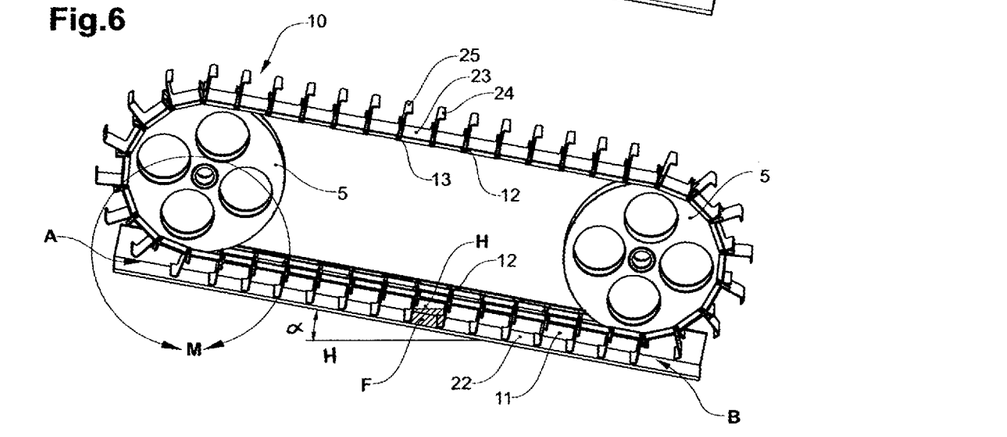
FIG. 6 shows the configuration from FIG. 5 with an open side wall for all vessels or chambers.
Figure 7:
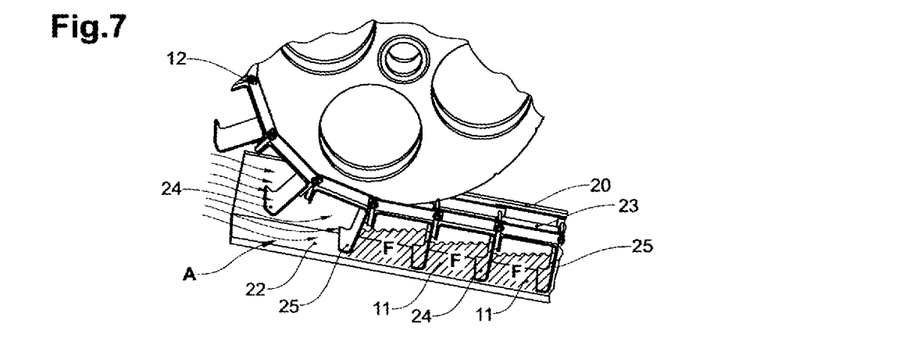
FIG. 7 shows an enlarged illustration of the side having the filling station A from FIG. 6.

A further configuration of the device consists in varying the type of containers, as are shown in FIGS. 5, 6 and 7.

If the containers are formed with displacement walls, for example two side walls along which displacement is possible, the base along which displacement is possible, with the front wall fixed and the lid, i.e. the top wall, fixed, the filling opening open and with the lid closeable, this produces a vessel or a chamber, which can be filled with liquid in order then for said liquid to be moved along said displacement wall until it is emptied out. This is something like kinematic reversal. The fixed walls (front, top and closed filling opening) are guided along three displacement walls (bottom, left-hand and right-hand side), which are not moved, and so the liquid flowing in can be "portioned" and transported in fixed portions, trapped in the chambers, along the gravity gradient. If one were to sit in one of the chambers, one would see the side walls the base passing by, with chamber contents always remaining the same.

FIG. 5 shows a conveying mechanism 10 having containers 11, having devices 5 for extracting power, which can be extracted at one of the deflections, wherein the containers 11 are equipped with three walls, specifically a first side wall 20, a second side wall 21 and a base 22, and with three "sliding" walls, specifically the upper wall 23, the rear wall 24 and the front wall 25. The walls 20, 21, 22 form a U-shaped channel, which closes off the transported liquid below and laterally with respect to the other three walls, such that no significant loss occurs. Complete leaktightness is not necessary.

FIG. 6 shows the same device as per FIG. 5 without the second side wall 21. On the left-hand side of the figure, the filling station A can be seen, and on the right-hand side the emptying station B can be seen. One chamber or one container 11 is filled with liquid F. This sits obliquely in the chamber because the latter is inclined at an angle to the horizontal H. The surface of the liquid therefore also assumes the horizontal H, in other words the chambers or containers can never be filled entirely. This is discussed below.

FIG. 7 shows a detail M from FIG. 6, by way of which the filling of the containers at the filling station A is discussed. On the left hand-side, the filling station A can be seen, where the liquid flows in, as indicated by a number of arrows. The liquid flows toward the front wall 25 of the container and a moment later is separated, so to speak portioned, by the rear wall 24. The portion F is then transported along the gradient and supplies the desired kinetic energy via the potential gradient. It can be seen that, with this arrangement and configuration of the containers, depending on the position, the rear wall 24 with respect to one container represents the front wall 25 with respect to the other container. The surface of the liquid adapts itself to the horizontal, as is shown by the three liquid portions F.

Figure 8A:
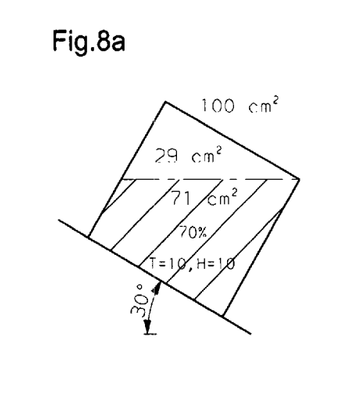
FIGS. 8a to 8f show container or chamber filling levels at different spacings and different inclination angles.
Figure 8B:
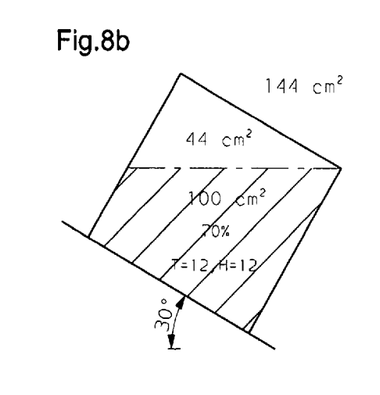
Figure 8C:
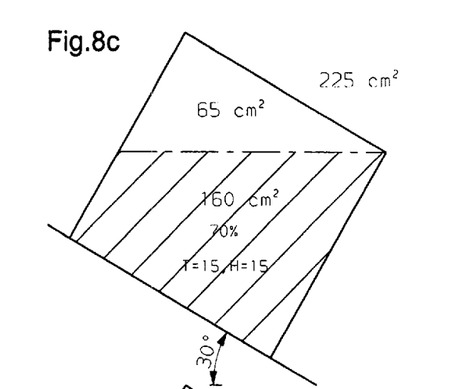
Figure 8D:
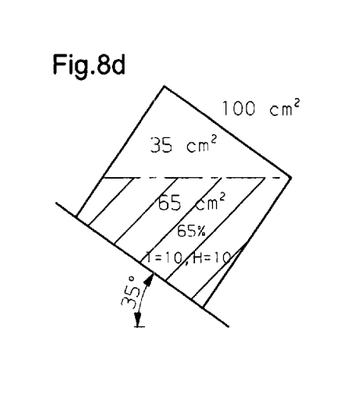
Figure 8E:
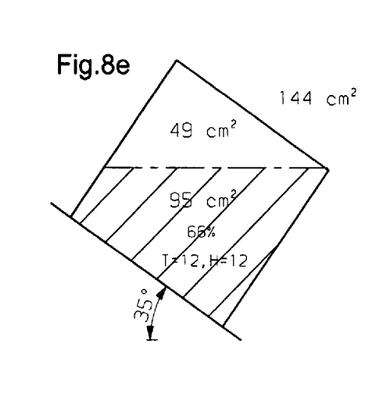
Figure 8F:
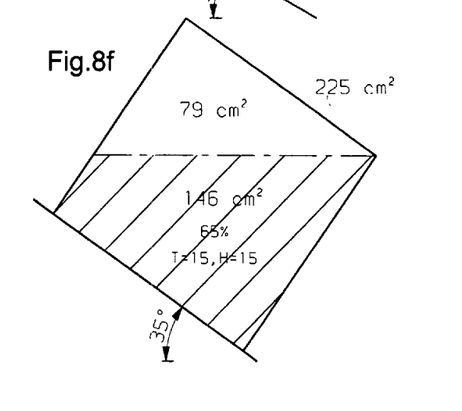

FIGS. 8a to 8f show the dependence of the filling on two inclination angles 30° and 35° and on the spacing T of the container walls and the size of the container walls. It is thus clear that a greater inclination does not transport significantly more mass than a smaller inclination. It can be seen from FIG. 8a (not true to scale) that this has a spacing of T=10, that is to say, for example, 10 cm from the rear wall 24 to the front wall 25, a height (and width) of H=10, that is to say a dimension of, for example, likewise 10 cm from the base 22 to the lid 23 (and from wall 20 to wall 21). In other words, a cube having side lengths of 10 cm. The 2-dimensional illustration suffices to illustrate the degree of filling. FIG. 8a shows a maximum degree of filling of around 70% at an inclination angle of 30° and a surface area of 100 cm$^2$. The "wet" surface area is 71 cm$^2$ and the "dry" surface area 29 cm$^2$. If the separation or chamber size is increased from 10 cm to 12 cm, totaling 144 cm$^2$, then the wet surface area is 100 cm$^2$ and the dry surface area 44 cm$^2$, which is a degree of filling of 70%. If the chamber size is increased to 15 cm, totaling 225 cm$^2$, then the wet surface area is 160 cm$^2$ and the dry surface area 65 cm$^2$, corresponding to a degree of filling of 70%. It can be seen that the degree of filling is dependent on the inclination angle and not on the size of the container. However, the kinetic energy to be produced depends on the mass transported. The larger the portion, the greater the energy to be produced.

If the inclination angle is changed from 30° to 35°, it can be seen with the same container sizes discussed above that the degree of filling drops to 65% but the potential energy or the kinetic energy increases.

Figure 9A:
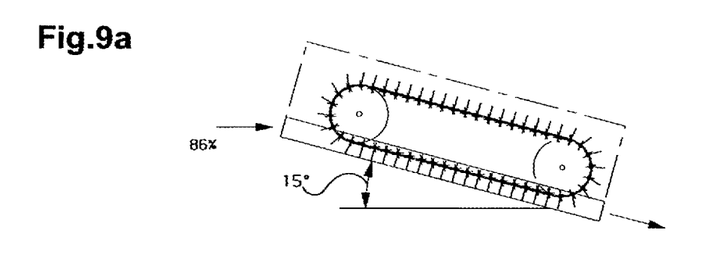
FIGS. 9a to 9d show inclinations and potential energy of the device from 15° to 35° at the maximum filling levels thereof at a corresponding inclination.
Figure 9B:
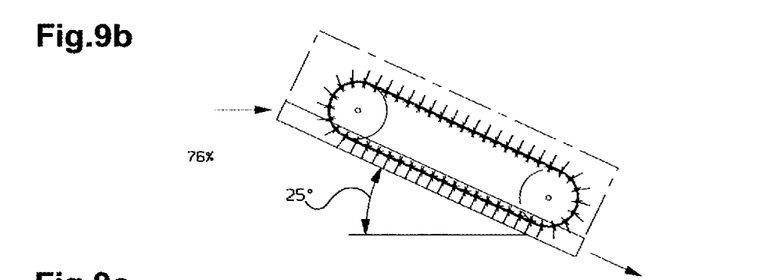
Figure 9C:
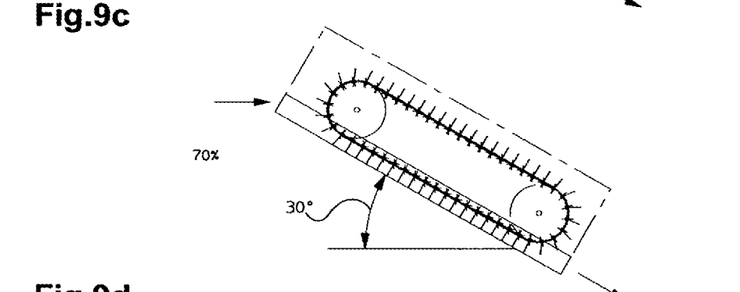
Figure 9D:
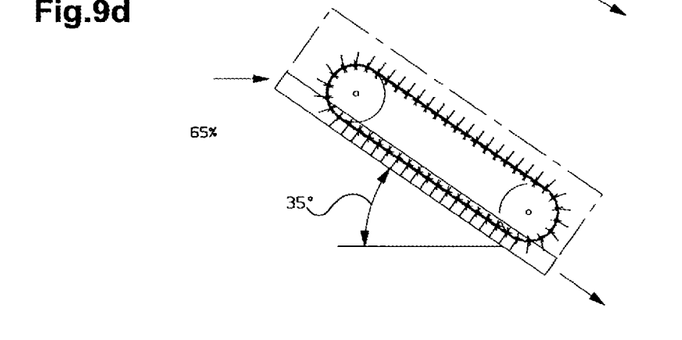

FIGS. 9a to 9d show inclinations and potential energy of the device from 15° to 35° at the maximum filling levels thereof at a corresponding inclination. Illustrated in the load strand are 18 chambers which are delimited here in a stylized manner. It is apparent that, as shown in FIGS. 8 et seq., less volume is filled into equal-sized containers at a greater inclination. Assuming that a container holds 100 liters, at 15° it is 86 liters, at 25° it is 76 liters, at 30° it is 70 liters and at 35° it is still 65 liters. Thus, with this decrease in the degree of filling, the downward slope forces are no longer linear, the more steeply the device is set, which they are only approximately anyway over the entire angular range. This results in the following approximate downward slope forces, calculated simply and without subtracting friction, return strand or the like therefrom: FIG. 9a, 18 containers by 86 liters=1 kp/liter each, by sin 15°=18×86 kp×0.259=400.65 kp, i.e. around 401 kp.

A 25° inclination (FIG. 9b) results in 18×76 kp×0.43=578 kp. A 30° inclination (FIG. 9c) results in 18×70 kp×0.5=630 kp. A 35° inclination (FIG. 9d) results in 18×65 kp×0.574=671 kp. When flowing water is utilized, angles having an inclination of greater than 35° are no longer optimal, but rather angles in the range of 10° to 20° are optimal.

Next, various container configurations for portioning quantities of liquid in order to them along an inclined plane or stretch in order to utilize gravity or the downhill slope force thereof in order to drive the device are discussed. This quite clearly relates not to the utilization of the kinetic energy of flowing liquid but to the gravity of a particular mass of the liquid. Why it is operated for example with flowing water results from the fact that there is sufficient water available, which can be scooped into the container or chambers.

Figure 10A:
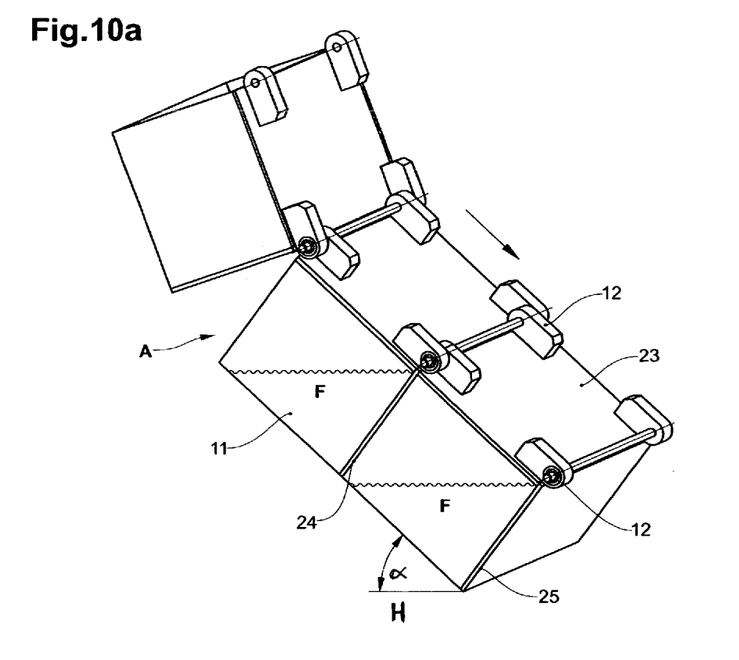
FIGS. 10a and 10b show an example of a container form which is open toward the rear in the working direction and is closed by the front wall of the following container.
Figure 10B:
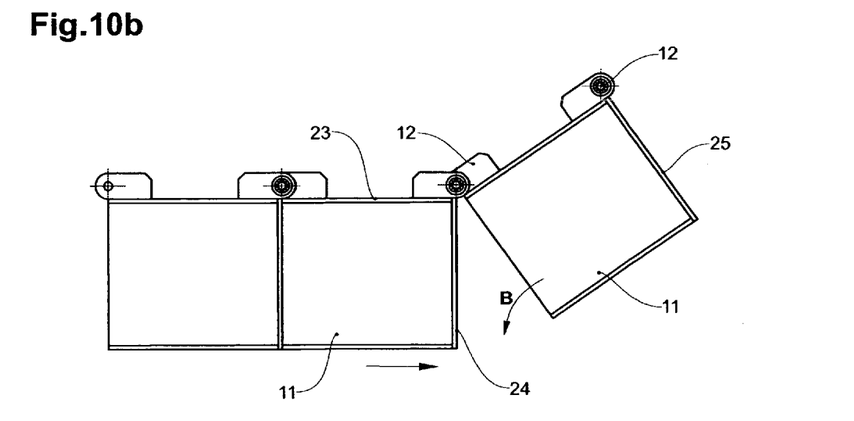

FIGS. 10a and 10b show an example of a container form which is open toward the rear as seen in the working direction (arrow) and is closed by the front wall of the following container, as soon as the containers 11 run into the foundation or plane. FIG. 10a shows the container formation inclined with respect to the horizontal. If water is introduced on the filling side A, then the containers are filled with a portion of liquid F. The wavy line represents the water surface in the container 11 in a stylized manner. FIG. 10b shows the container formation from the side in a horizontal position, so that water can run out on the emptying side B (illustrated by a curved arrow). It is clear that this is only a part of the device and the containers which are not illustrated and are held together by connecting means 12 combine to form a load strand and a return strand.

Figure 11:
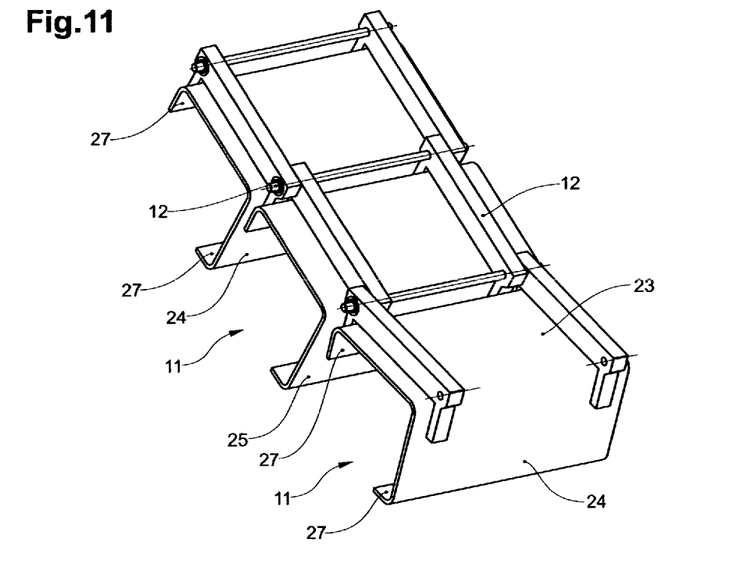
FIG. 11 shows, in somewhat more detail, the container or chamber form as is illustrated in FIGS. 5-7.

FIG. 11 shows in somewhat more detail the container or chamber form as illustrated in FIGS. 5-7. Not illustrated are the two side walls 20/21 and the base 22 of the overall container or chamber 11. The part chambers are formed by a substantially right-angled profile having two angled portions 27 which are held together by means of connecting means 12. The angled portions 27 form corresponding supports for the front walls of the following chamber, which form the rear walls of the preceding chamber, and they also form supports for sliding past on the bases or base 22. The supports form at the same time a seal in order that the contents do not begin to empty out in the course of the gradient. The little that runs from chamber to chamber is always replaced from the upper chambers.

Figures 12A, 12B:
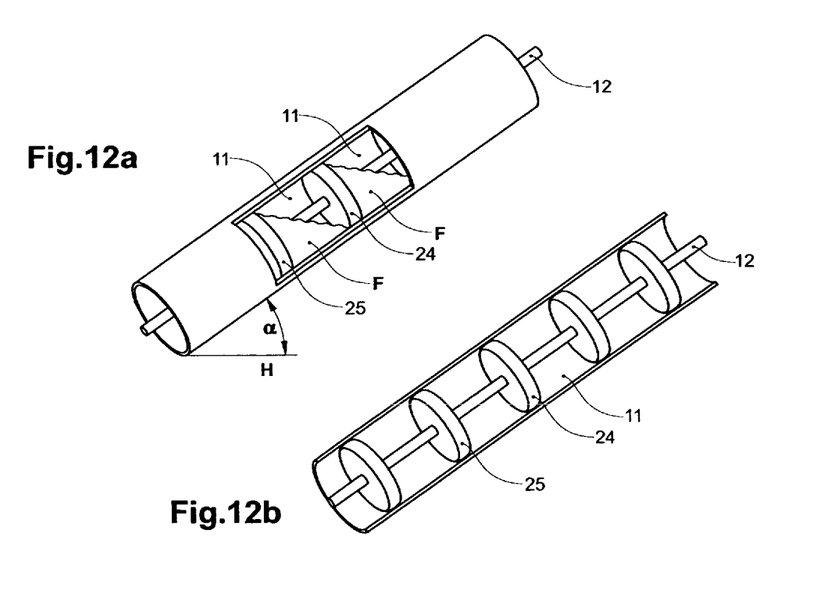
FIGS. 12a and 12b show a further container form modified to form chambers or containers.

FIGS. 12a and 12b show a further container form modified to form successive chambers. This device consists essentially of a pipe in which plate-like container walls, specifically rear walls 24 and front walls 25, form chambers with respect to the pipe walls. It can be seen here that the idea of portioning the liquid in order to utilize its gravity for driving purposes, can be varied greatly, without departing from the principle. Pipes are cheap and easy to lay. The figures show a part of the load strand, the return strand can likewise be guided in a pipe or else in a channel from the emptying station B to the filling station A. FIG. 12a shows a pipe having a cutout, through which it is possible to see the chambers 11 having the portion of liquid F. This is located in the direction of the downhill slope force between a rear wall 24 and a front wall 25. The side walls 20/21 and the base 22 and the upper wall 23 are formed by the pipe, which surrounds the chambers 11. The respectively front and rear walls 24/25 are held together by the connecting means 12 or a bendable type of string, which is clearly shown by the entirely sectioned FIG. 12b. This kind of connection requires no joints, thereby making the device cheaper and also robust and less susceptible to faults.

Further variants, from the many variants not illustrated here, for portioning a drive means for weighing down in order to utilize gravity in the form of downhill slope force, do not depart from the idea of the invention and belong within the scope of protection of the patent.

LIST OF REFERENCE SIGNS

1 Wedge-shaped foundation
2 Support means
3 Generator
4 Axle
5 Device for extracting power
10 Conveying mechanism
11 Container
12 Connecting means
13 Emptying flap
15 Axle
   16 Cavity
   17 Recesses
   20 First side wall
   21 Second side wall
   22 Base
   23 Upper wall
   24 Rear wall
   25 Front wall
   27 Angled portion/support
   A Loading point or filling station
   B Emptying point or emptying station
   H Horizontal
   F Portion of liquid
   T Spacing

The invention claimed is:
1. A conveying device for producing energy, comprising:
a circulating conveying mechanism that comprises a load strand and a return strand, said load strand being formed by a plurality of displaceable wall units and being movable along an oblique plane,
wherein the displaceable wall units are slidable or rollable downward within a stationary, open channel on the oblique plane at an angle in the load strand, wherein the load strand moves the return strand, and a device for extracting power, said device being moved by the circulating conveying mechanism, and wherein the device for extracting power has a means for outputting energy, wherein the stationary, open channel is formed by first and second stationary side walls and a stationary base, wherein the stationary, open channel is arranged between an upper and lower deflection of the load strand, wherein the displaceable wall units are movable with respect to the stationary, open channel; and wherein the displaceable wall units and the stationary, open channel cooperate to form closed containers, wherein the displaceable wall units in each case comprise a portioning wall that forms a rear wall of a preceding container and a front wall of a subsequent container, and a displaceable upper wall that forms a lid of the closed container on an open side of the stationary, open channel, and wherein in a region of the displaceable upper wall the displaceable wall units are joined together via connecting elements to form the load and return strand, wherein the closed containers in each case form a chamber that is fillable with a liquid, and wherein the chambers in each case are movable along with said displaceable wall units and relative to the stationary, open channel until the chambers are emptied out.

2. The conveying device as claimed in claim 1, wherein the displaceable walls of the containers are arranged so as to slide in said stationary, open channel in the load strand.

3. The conveying device for producing energy as claimed in claim 1, wherein the load strand lies or is guided in the oblique plane and the return strand is guided back either upside-down or in an inclined manner with respect to a section plane through the conveying mechanism.

4. The conveying device for producing energy as claimed in claim 1, wherein the device for extracting power has means which form a temporary form fit by way of the containers of the conveying mechanism.

5. The conveying device for producing energy as claimed in claim 4, wherein the temporary form fit is formed by the means engaging into the chambers in the containers.

6. The conveying device for producing energy as claimed in claim 5, wherein the means for engaging into the chambers in the containers are cams.

7. The conveying device for producing energy as claimed in claim 1, wherein the device for extracting power is an electricity generator.

8. The conveying device for producing energy as claimed in claim 1, wherein the device has support means such that the device for producing energy is always mountable and mounted obliquely to a horizontal plane forming a base, and wherein the angle is set depending on the power requirement.

9. The conveying device for producing energy as claimed in claim 1, wherein the device has support means such that the device for producing energy is always mountable and mounted obliquely to a horizontal plane forming a base, and wherein the length of the load strand is selected depending on the power requirement.

10. A method for operating the device as claimed in claim 1, wherein while the conveying mechanism circulates, a first closed container running into the load strand is loaded with a material for weighing down and said material is emptied out shortly before the first closed container leaves the load strand.

11. The method as claimed in claim 10, wherein the material for weighing down is divided into portions along the load strand and each portion makes a part contribution to the overall downhill slope force.

12. The method as claimed in claim 10, wherein the material for weighing down is filled continuously or in batches into the first closed container running into the load strand.

13. The method as claimed in claim 10, wherein the material for weighing down is liquid or solid but having bulk material capability.

14. The method as claimed in claim 10, wherein depending on the power requirement, the inclination of the oblique plane is selectable and set.

15. The method as claimed in claim 10, wherein depending on the power requirement, the length of the load strand is selectable and accordingly used.

16. The method as claimed in claim 10, wherein depending on the power requirement, the degree of filling of the closed containers is selectable and accordingly set.

* * * * *